United States Patent [19]

Park

[11] Patent Number: 6,040,879
[45] Date of Patent: Mar. 21, 2000

[54] METHOD FOR DECODING VIDEO DATA CORRUPTED BY CHANNEL NOISE

[75] Inventor: Dong seek Park, Daegu, Rep. of Korea

[73] Assignee: Samsung Electronics Co., Ltd., Kyungki-do, Rep. of Korea

[21] Appl. No.: 08/844,654

[22] Filed: Apr. 21, 1997

[51] Int. Cl.[7] ........................................ H04N 7/32
[52] U.S. Cl. ......................... 348/845.1; 348/409
[58] Field of Search ............... 348/390, 400–402, 348/405, 407, 409–413, 415, 416, 420, 699, 845.1; 382/232, 233, 236, 238; H04N 7/32

[56] References Cited

U.S. PATENT DOCUMENTS

| | | | |
|---|---|---|---|
| 4,827,339 | 5/1989 | Wada et al. | 348/390 |
| 5,150,210 | 9/1992 | Hoshi et al. | 348/413 |
| 5,172,246 | 12/1992 | Yoshida | 348/405 |
| 5,550,847 | 8/1996 | Zhu | 348/409 |
| 5,719,646 | 2/1998 | Kikuchi et al. | 348/845.1 |
| 5,731,840 | 3/1998 | Kikuchi et al. | 348/416 |

FOREIGN PATENT DOCUMENTS

651584A2   5/1995   European Pat. Off. .

Primary Examiner—Richard Lee
Attorney, Agent, or Firm—Sughrue, Mion, Zinn, Macpeak & Seas, PLLC

[57] ABSTRACT

In a video decoding method, the video data to be decoded is arranged in a first unit, which first unit includes a plurality of second data units, and each of which second data unit includes an information on a status of the second data unit. First, it is determined whether the status information in a current second unit is invalid or not. If it is determined that the status information in the second unit is invalid, the status information is changed into another one among a set of possible status information to decode the video data from the current second unit to a last second unit in a current first unit on the basis of the changed status information. Afterwards, if the decoding of video data from the current second unit to the last second unit in the current first unit was successful for none of the possible status information, a flag representing an encoding scheme of the video data is changed such that the flag indicates that the second unit is encoded in an inter-frame mode. Then, the video data from the current second unit to the last second unit in the current first unit is decoded according to the changed flag. Finally, the video data from the current second unit to the last second unit in the current first unit is replaced with those in a previous frame if the decoding of the video data in the step (d) was unsuccessful.

3 Claims, 3 Drawing Sheets

| COD | MCBPC | MODB | CBPB | CBPY | DQUANT | MVD | MVD$_2$ | MVD$_3$ | MVD$_4$ | MVDB | BLOCK DATA |

METHOD FOR DECODING VIDEO DATA CORRUPTED BY CHANNEL NOISE

BACKGROUND OF THE INVENTION

1. Field of the Invention

The present invention relates to a video data decoding method, more particularly, to a method for detecting and correcting an error in a video data received at decoder.

2. Description of the Related Arts

Error-robustness has been one of the major concerns in video communication, particularly in a system having a channel which is prone to many of errors such as a wireless communication system. Thus, much effort has been expended for enhancing the error-robustness of a transmitted data in a video communication system.

The methods for enhancing the error-robustness in video communication systems can be roughly divided into two categories in a viewpoint of a feedback channel concept. One is a feedback method and the other is a feedforward method.

In a typical feedback method, data is re-transmitted according to an interaction between a decoder and an encoder.

FIG. 1 is a conceptual block diagram of a wireless communication system in which the feedback method is applied.

When a decoder 15 fails to decode the received bit stream due to an error introduced in a channel, an error detector 16 detects the error or the portion of the data in which the error exists, and sends to encoder 11 feedback information such as a negative acknowledgment (NAK) for automatic-retransmission-request (ARQ) via either a control channel or a data channel. In addition to the retransmission of the data, the decoder 14 may ask the encoder 11 to perform INTRA update, with or without error tracking messages, or unequal error protection (UEP). In FIG. 1, the reference numerals 12 and 14 indicate RF units in the encoder and the decoder side, respectively.

Replenishment by these methods guarantees a fast error recovery to eventually enhance the picture quality.

However, the feedback channel method decreases the total channel throughput and increases the complexity of the communication system in which the method is implemented even though it offers fast updates of erroneous frames and promising quality of service (QOS).

Furthermore, one of the important issues in the feedback method is that the feedback information should not be corrupted by errors. More feedback information needs to be transmitted if the feedback information is corrupted, or the total system malfunctions until the system is refreshed by a correction.

On the other hand, the feedforward method involves just a slight increase in the complexity of a video encoder or a decoder for error-robustness and/or improves the quality-of-service (QOS) since it does not use a feedback information. In contrast to the feedback method, the feedforward method maintains the total channel throughput and the complexity of the communication system in which the method is implemented is quite Low.

There are two possible implementations of feedforward techniques: error estimation at an encoder and error detection/correction at a decoder.

FIG. 2A is a conceptual block diagram of a wireless communication system in which a feedforward technique of an error estimation type is applied.

In the system shown in FIG. 2A, an encoder 21 estimates channel errors by monitoring RF power or calculating error metrics by use of an error model 22 in order to refresh or unequally protect the encoded pictures. Then, the picture data is transmitted, along with estimated channel error information, to a decoder 26 via two RF units 23 and 25 and a channel therebetween.

Refreshment of certain parts of the possible erroneous picture produces fast error-recovery, while unequal error protection enhances the error-robustness. Provided that the error estimation model 22 in the encoder 21 is highly reliable, this method allows the decoder to have an improved quality of service (QOS).

However, this method usually adds auxiliary information for error-robustness, which may increase total bit budget. Two other disadvantages are vulnerability of the auxiliary information to channel errors during transmission and possible errors that occur in the unprotected region.

FIG. 2B is a conceptual block diagram of a wireless communication system in which a feedforward technique of an error detection/correction type is applied.

In the system shown in FIG. 2B, an error detector 36 gives a decoder 35 information on errors in the data transmitted from an encoder 31 via RF units 32 and 34 and a channel therebetween, so that the decoder 35 corrects the errors.

In this method, the error is detected and corrected only in the decoder side for incoming bit streams, as depicted in the FIG. 2B. One of the typical methods falling into the latter case is an error concealment method.

The basic idea behind this method is that, when the decoder locates erroneous syntax (e.g., administrative information, motion vectors, DC/AC coefficients, etc.), the decoder either replaces an erroneous group-of-block (GOB) or macro-block (MB) data with error-free GOB or MB data in the previous frame or utilizes motion vector information on GOB/MB in the previous frame for successful concealment of the current erroneous GOB/MB in order that subjective visual distortion is not noticeable.

Some of the advantages of this technique are relatively good visual quality at low bit rate and low complexity in implementation. However, at high bit rate communication where high picture quality is required, an error propagation effect can be noticeable due to possible accumulated errors.

Since we are mainly concerned about H.263 in the present invention, it is worth while mentioning some features of H.263 compared to H.261. One of the arresting features of H.263 is four negotiable options that definitely offers much improved performance over H.261. In addition, H.263 has much simpler syntax structure by eliminating a motion vector (MV) delimiter, which also provide better compression.

Meanwhile, the beauty of H.263 can be guaranteed only if the channel is highly reliable, e.g. in a wired ISDN and PSTN line in which the bit-error-rate has an order of magnitude of $10^{-8}$ or $10^{-9}$ such that it is negligible. However, advantages of H.263 cannot be guaranteed on an error-prone channel for the following reasons: (1) A wireless channel having both a random and a burst error undergoes corruption of information in a variable length coding (VLC) mode. (2) Negotiable options make administrative information, e.g., a macro-block type & coded block pattern for chrominance (MCBPC), have a full set of possible syntax elements for, which it is difficult to check errors at the decoder. In other words, added information due to four negotiable options also make H.263 bit stream vulnerable to channel errors in wireless links. (3) Due to the absence of a macro-block (ME) delimiter, the number of blocks to be discarded is increased.

SUMMARY OF THE INVENTION

The object of the present invention is to provide a decoding method which can effectively decode corrupted video data by sacrificing coding efficiency and reduce the number of macro-blocks to be discarded.

To achieve the above object, there is provided a method for decoding video data which is arranged in a first unit, which first unit includes a plurality of second data units, and each of which second data units includes information on a status of the second data unit. The method comprises the steps of (a) determining whether the status information in a current second unit is invalid or not; (b) changing the status information into another one among a set of possible status information to decode the video data from the current second unit to a last second unit in a current first unit on the basis of the changed status information if it is determined that the status information in the second unit is invalid in the step (a); (c) changing a flag representing an encoding scheme of the video data such that the flag indicates that the second unit is encoded in an inter-frame mode if the decoding of video data from the current second unit to the last second unit in the current first unit was successful for none of the possible status information; (d) decoding the video data from the current second unit to the last second unit in the current first unit according to the changed flag; and (e) replacing the video data from the current second unit to the last second unit in the current first unit with corresponding second units in a previous frame if the decoding of the video data in the step (d) was unsuccessful.

DETAILED DESCRIPTION OF THE PREFERRED EMBODIMENTS

In a most preferred embodiment of the present invention, data is encoded and transmitted according to an H.263 protocol which was recommended by International Telecommunications Union (ITU).

In the H.263 protocol, each picture is divided into groups of blocks(GOBs). Also, each GOB is divided into macro-blocks (MBs). Further, a macro-block consists of four luminance blocks and two spatially corresponding color difference blocks.

Figure 1:
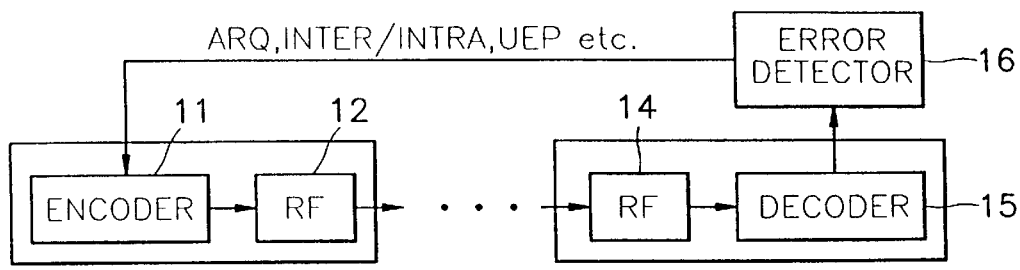
FIG. 1 is a conceptual block diagram of a wireless communication system in which a feedback method is applied.
Figure 2A:
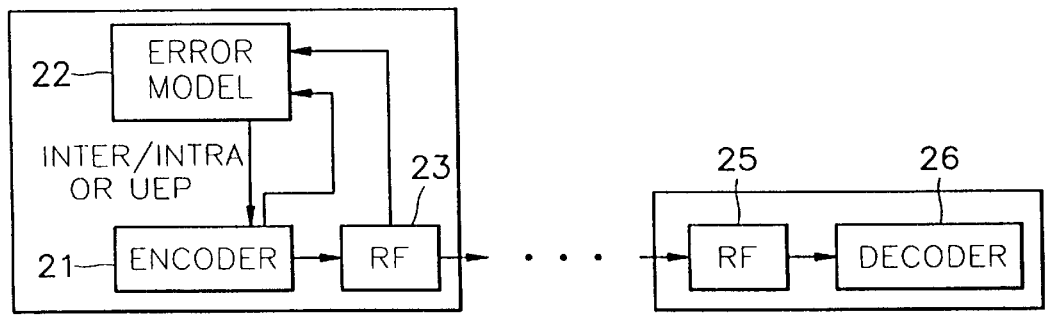
FIG. 2A is a conceptual block diagram of a wireless communication system in which a feedforward technique of an error estimation type is applied.
Figure 2B:
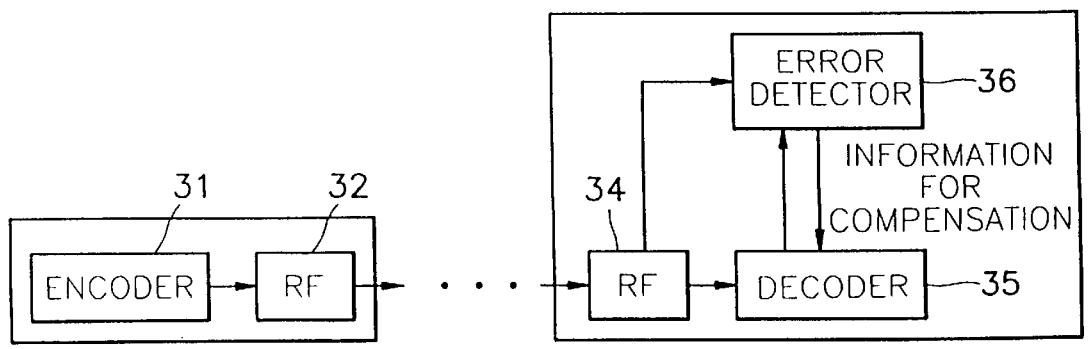
FIG. 2B is a conceptual block diagram of a wireless communication system in which a feedforward technique of an error detection/correction type is applied.
Figures 3, 4:
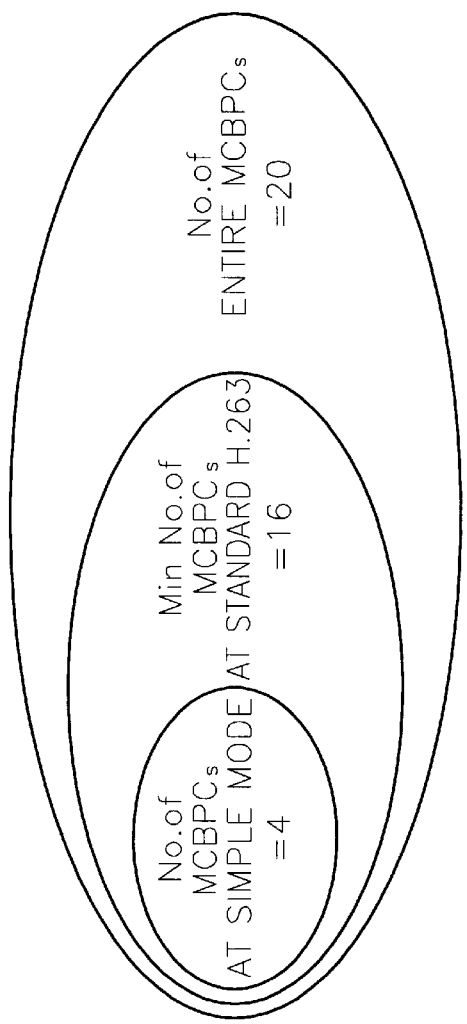
FIG. 3 illustrates a typical structure of the macro-block layer in the H.263 protocol.
FIG. 4 shows the number of possible sets of MCBPCs in each encoding mode.

FIG. 3 illustrates a typical structure of the macroblock layer in the H.263 protocol.

As shown in the FIG. 3, data for each macro-block consists of a macro-block header followed by data for blocks. The macro-block header includes a coded macro-block indication (COD), a macro-block type & coded block pattern for chrominance (MCBPC), a macro-block mode for P-blocks (MOTDB), a coded block pattern for B-blocks (CBPB), a coded block pattern for luminance (CRPY), a quantization information (DQUANT), arid motion vector data (MVD, $MVD_2$, $MVD_3$, $MVD_4$, and MVDB)

The COD is only present for each macro-block in pictures coded in inter-frame (INTER) mode. Also, the MCBPC is a variable length codeword giving information about the macroblock type and coded block pattern of chrominance. The MODB is present for macro-blocks type 0–4 under a PB-frame mode which is optional. The CBPY, the DQUANT, the MVD and MVD2 through $MVD_4$ are present when indicated by the MCBPC. The CEPE and the MVDB are only present if indicated by the MODB.

Also, in the structure of the macro-block of FIG. 3, the block data is present when indicated by the MCBPC and the CBPY.

In the present embodiment, a decoder receives video data which was encoded at a basic encoding mode which does not employ four negotiable coding options recommended in H.263 for improved performance. Thus, a decoder can easily locate some syntax errors which are very difficult to find when full functionality of H.263 are utilized by employing negotiable options.

The key idea of the present invention is, in other words, that the syntax errors can easily be detected when the video data is encoded without the use of any negotiable option.

Furthermore, the video data is encoded at a simple encoding mode which is even simpler than the basic encoding mode. In the simple encoding mode, every single frame is encoded at INTER mode except the first frame, which is encoded at INTRA mode. Further, none of four negotiable options is employed. The simple encoding mode does no-include any change of quantization value during communication either.

If the data is encoded in the simple mode, the correction of syntax errors can be enhanced because the decoder already knows some possible and expected patterns of syntax.

Meanwhile, an error in the MCBPC or the CBPY of all syntax errors play critical role in reconstructed image quality. Corruption of MCBPC and/or CBPY cause lots of visually annoying artifacts. Thus, in the present invention, video data is decoded on the basis of an error which exists in the MCBPC.

FIG. 4 shows the number of possible sets of MCBPCs in each encoding mode.

The number of elements of the possible MCBPCs is 20 when negotiable options, INTRA update, and adaptive quantization are used, while the number is 16 under standard H.263. However, there are just 4 possible MCBPCs {0x00, 0x10, 0x10, 0x30} under the simple encoding mode which was defined above. The numbers of possible MCBPCs described above exclude the consideration of one possible MCBPC for bit stuffing because the information on bit stuffing can be easily decoded even under the simple mode.

Figure 5:
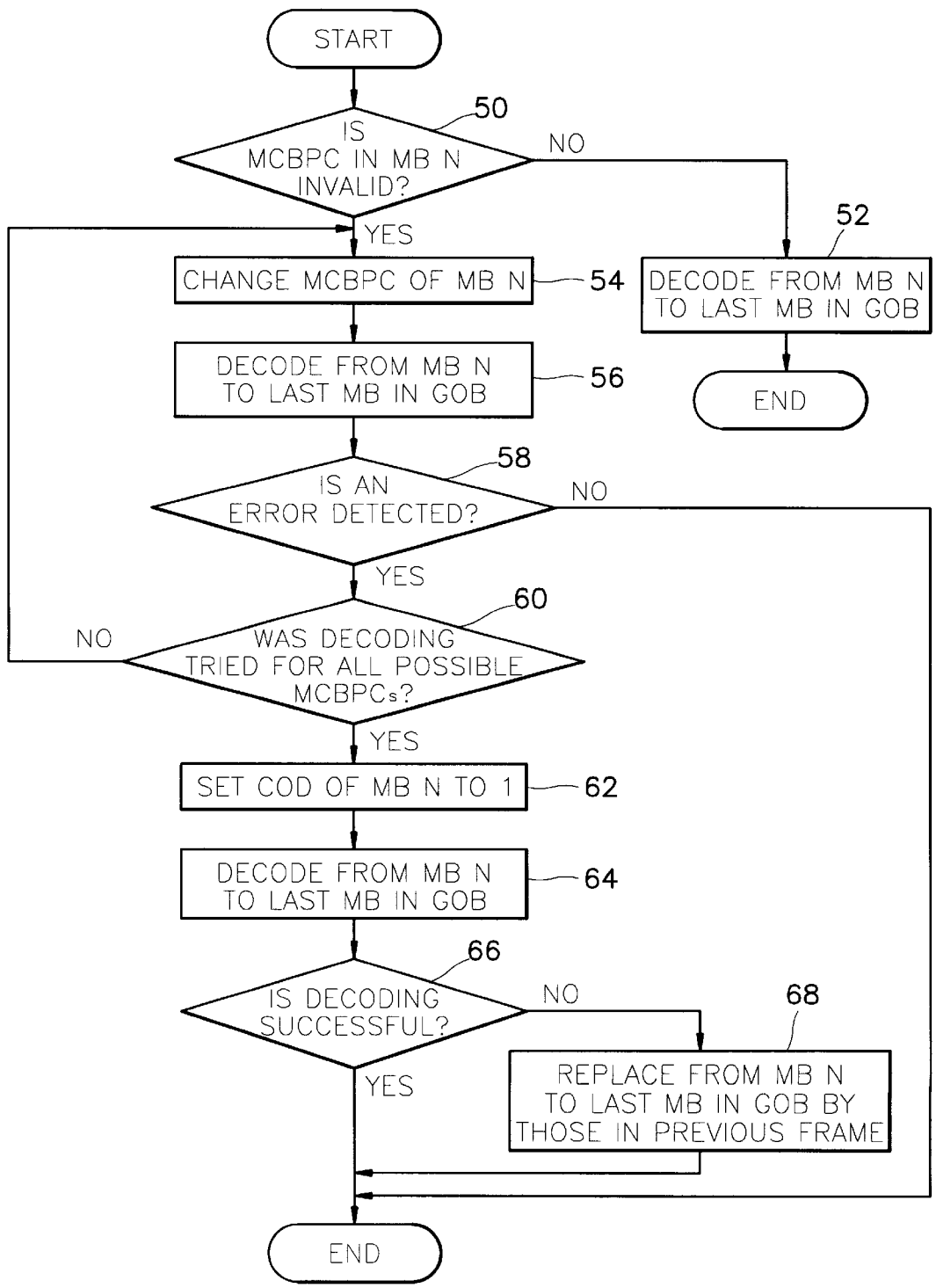
FIG. 5 is a flowchart showing a preferred embodiment of the present invention.

FIG. 5 is a flowchart showing a preferred embodiment of the present invention.

In step 50, it is determined whether the MCBPC in a macro-block MB is invalid or not. The macro-block for which the determination is carried out is referred to as an n-th macro-block MB N. Meanwhile, the existence of an MCBPC means the COD of given MB set to 0. If the COD of an MB is 1, then no further information is transmitted for this MB. In such a case, the decoder shall treat the MB as one encoded in inter-frame mode (INTER MB) with motion vector for the whole block equal to zero with no coefficient data.

If it is determined that the MCBPC in the MB N is valid in the step 50, macro-blocks from MB N to the last MB in the current group of blocks (GOB) is decoded in step 52, and the procedure is terminated.

If it is determined that the MCBPC in the MB N is invalid in the step 50, the decoding is continued with four possible MCBPCs of MB N until decoding the current GOB is finished. For the purpose, the MCBPC is changed into another one among the possible MCBPCs (step 54). Then, macro-blocks from MB N to the last MB in the current GOB are decoded on the basis of the changed MCBPC in step 56. Afterwards, it is determined whether there occurs an error between MB N and the end of the current GOB (step 58). If there exists no error and decoding is performed successfully, the procedure is terminated. However, if it is determined that an error occurred during the decoding in the step 58, it is determined whether the decoding was tried for all the possible MCBPCs (step 60). It it is determined that the decoding was not tried for all the possible MCBPCs in the step 60, the steps 54 to 60 are repeated.

If it is determined that the decoding was tried for all the possible MCMPCs in the step 60, in other words, the decoding of data from MB N to the end of the current COB was successful for- none of the possible MCBPCs, a coded macro-block indication (COD) is set to 1 to indicate the MB N is a macro-block encoded in inter-frame mode (INTER MB) in step 62.

Afterwards, macro-blocks from MB N to the end of the current GOB is decoded in step 64. During this process, the decoder needs to try four possible MCBPCs for MB N+1. If it is determined that the decoding is successful in step 66, the procedure is terminated.

However, if it is determined that the decoding is not successful in step 66, the erroneous macro-blocks from MB N to the end of the current GOB are replaced with error-free macro-blocks in the same position of the previous frame (step 68).

Through computer simulations, the error correction method of the present invention turned out to be very effective in removing "green/pink" block artifacts. In addition, much improvements were achieved in resultant peak-to-peak signal-to-noise ratio (PSNR) curves which are measures of the similarity between the original and reproduced. Also, by employing COD and MCBPC error correction, about 10% of total erroneous macro-blocks of the "car phone" sequence at 55 kbps were successfully decoded.

Of course, coding efficiency of H.263 is deteriorated a little according to the present invention.

However, by sacrificing the coding efficiency of H.263, one can get effective video decoding in an error prone channel by detecting and correcting syntax errors. That is, an error detection can be achieved easily so that visually annoying block artifacts are removed. Also, the system can maintain constant channel throughput because this invention does not employ any kind of feedback method. Further, the present invention offers additional improvement of visual quality because it reduces the number of macro-blocks to be discarded.

What is claimed is:

1. A method for decoding video data which is arranged in a first unit, the first unit including a plurality of data units, and each of the data units including information on a status of the respective data unit, said method comprising the steps of:

(a) determining whether the status information in a current data unit is invalid or not;

(b) changing the status information into another one among a set of possible status information to decode the video data from the current data unit to a last data unit in a current first unit on the basis of the changed status information if it is determined that the status information in the data unit is invalid in said step (a);

(c) changing a flag representing an encoding scheme of the video data such that the flag indicates that the data unit is encoded in an inter-frame mode if the decoding of video data from the current data unit to the last data unit in the current first unit was successful for none of the possible status information;

(d) decoding the video data from the current data unit to the last data unit in the current first unit according to the changed flag; and (e) replacing the video data from the current data unit to the last data unit in the current first unit with corresponding data units in a previous frame if the decoding of the video data in said step (d) is unsuccessful.

2. A method for decoding video data as claimed in claim 1, further comprising a step of decoding the video data from the current data unit to the last data unit in the current first unit on the basis of the status information after said step (a).

3. A method for decoding video data as claimed in claim 1, wherein said step (b) comprises the steps of:

(b1) changing the status information into another one among the set of possible status information;

(b2) decoding the video data from the current data unit to the last data unit in the current first unit on the basis of the changed status information;

(b3) determining whether there occurs an error between the current data unit and the last data unit in the current first unit;

(b4) determining whether there is any status information among the set of possible status information on the basis of which said step (b2) was not tried if it is determined, in said step (b3), that an error occurred during the decoding of the video data from the current data unit to the last data unit; and (b5) repeating said steps (b1) to (b4) if it is determined, in said step (b4), that there is a status information among the set of possible status information on the basis of which said step (b2) was not tried.

* * * * *